United States Patent
Abedini et al.

(10) Patent No.: US 11,606,721 B2
(45) Date of Patent: Mar. 14, 2023

(54) TIMING CONFIGURATION OF A LAYER-1 MILLIMETER WAVE REPEATER

(71) Applicant: QUALCOMM Incorporated, San Diego, CA (US)

(72) Inventors: Navid Abedini, Somerset, NJ (US); Raju Hormis, New York, NY (US); Junyi Li, Chester, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/795,163

(22) Filed: Feb. 19, 2020

(65) Prior Publication Data

US 2020/0280887 A1 Sep. 3, 2020

Related U.S. Application Data

(60) Provisional application No. 62/812,068, filed on Feb. 28, 2019.

(51) Int. Cl.
*H04W 28/16* (2009.01)
*H04W 92/12* (2009.01)
*H04W 84/04* (2009.01)

(52) U.S. Cl.
CPC .......... *H04W 28/16* (2013.01); *H04W 84/045* (2013.01); *H04W 92/12* (2013.01)

(58) Field of Classification Search
None
See application file for complete search history.

(56) References Cited

U.S. PATENT DOCUMENTS 11,039,337 B2 * 6/2021 Yoshizawa ............ H04L 1/1854
2002/0167337 A1 11/2002 Chelcea et al.
(Continued)

FOREIGN PATENT DOCUMENTS

GB 2501932 A 11/2013

OTHER PUBLICATIONS

Samsung, 4G-5G Interworking, Jun. 2017, pp. 1-17. (Year: 2017).*
(Continued)

*Primary Examiner* — Nicholas Sloms
(74) *Attorney, Agent, or Firm* — Qualcomm Incorporated

(57) ABSTRACT

Various aspects of the present disclosure generally relate to wireless communication. In some aspects, a base station may receive, from a repeater having a first interface and a second interface, information associated with one or more capabilities of the repeater, the second interface being different from the first interface. The base station may determine an operation mode for the repeater based at least in part on the information associated with the one or more capabilities of the repeater, and may communicate with the repeater via the first interface or the second interface. In some aspects, a repeater may transmit, to a base station via a first interface, information associated with one or more capabilities of the repeater, and may communicate via the first interface or via a second interface in accordance with an indicated operation mode, the second interface being different from the first interface. Numerous other aspects are provided.

74 Claims, 9 Drawing Sheets

(56) References Cited

U.S. PATENT DOCUMENTS

| | | | |
|---|---|---|---|
| 2011/0078527 A1* | 3/2011 | Seshadri | H04L 1/008 |
| | | | 714/746 |
| 2013/0272190 A1* | 10/2013 | Du | H04W 28/16 |
| | | | 370/315 |
| 2015/0327204 A1* | 11/2015 | Park | H04W 56/0015 |
| | | | 370/350 |
| 2016/0044613 A1* | 2/2016 | Cai | H04W 88/04 |
| | | | 370/315 |
| 2017/0230893 A1* | 8/2017 | Miao | H04B 7/15542 |
| 2018/0249461 A1* | 8/2018 | Miao | H04W 24/02 |
| 2018/0270670 A1* | 9/2018 | Soelberg | H04W 28/0289 |
| 2019/0165850 A1* | 5/2019 | Achour | H01Q 3/44 |
| 2019/0215906 A1* | 7/2019 | Phuyal | H04L 1/1854 |
| 2020/0195310 A1 | 6/2020 | Abedini et al. | |
| 2020/0267516 A1* | 8/2020 | Alasti | H04W 72/082 |
| 2020/0280127 A1 | 9/2020 | Hormis et al. | |
| 2020/0280355 A1 | 9/2020 | Abedini et al. | |
| 2020/0280365 A1 | 9/2020 | Abedini et al. | |
| 2021/0136859 A1* | 5/2021 | Yoo | H04W 76/27 |

OTHER PUBLICATIONS

International Search Report and Writtenn Opinion—PCT/US2020/018992—ISA/EPO—dated Jun. 17, 2020.
Co-Pending U.S. Appl. No. 62/848,929, filed May 16, 2019.

\* cited by examiner

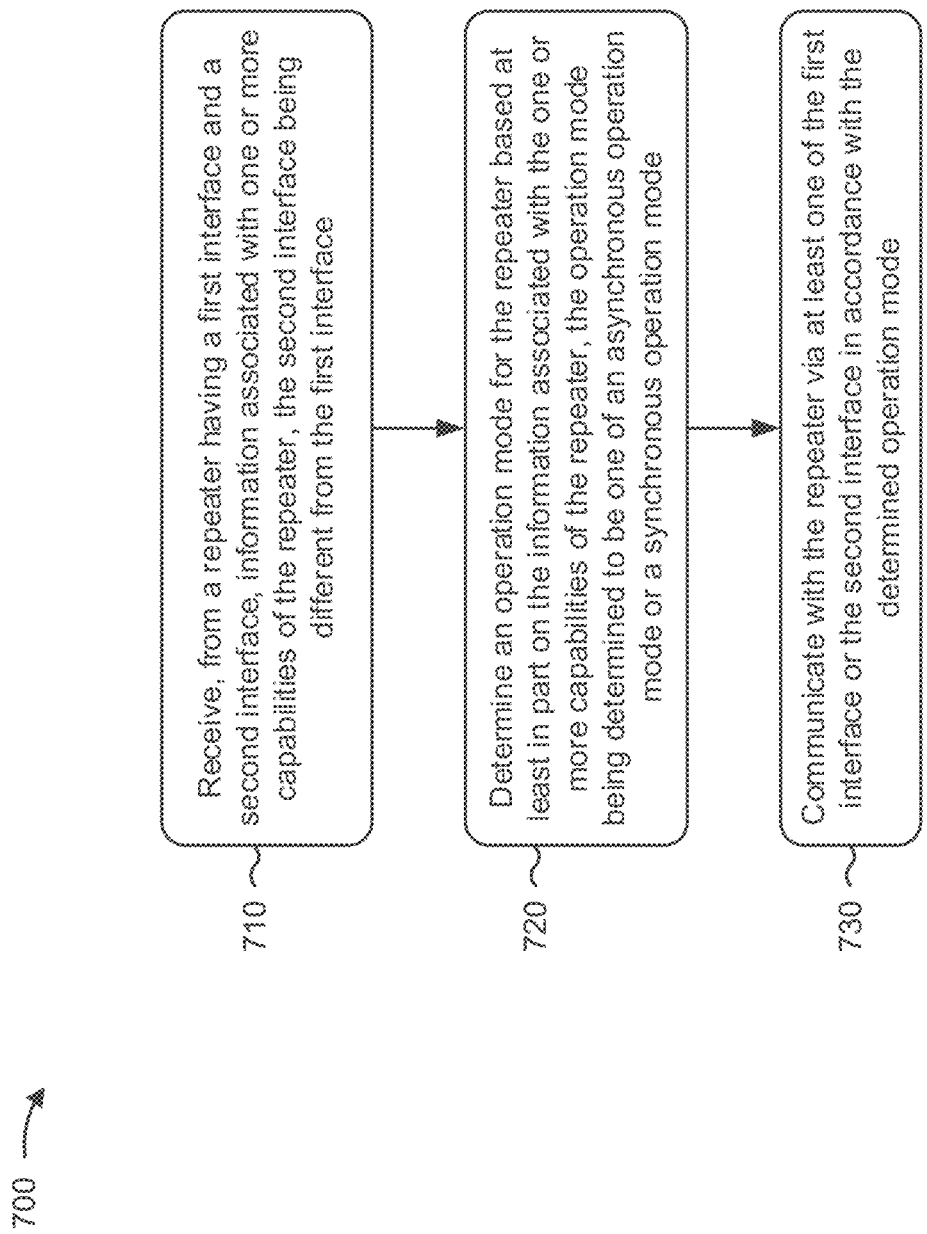

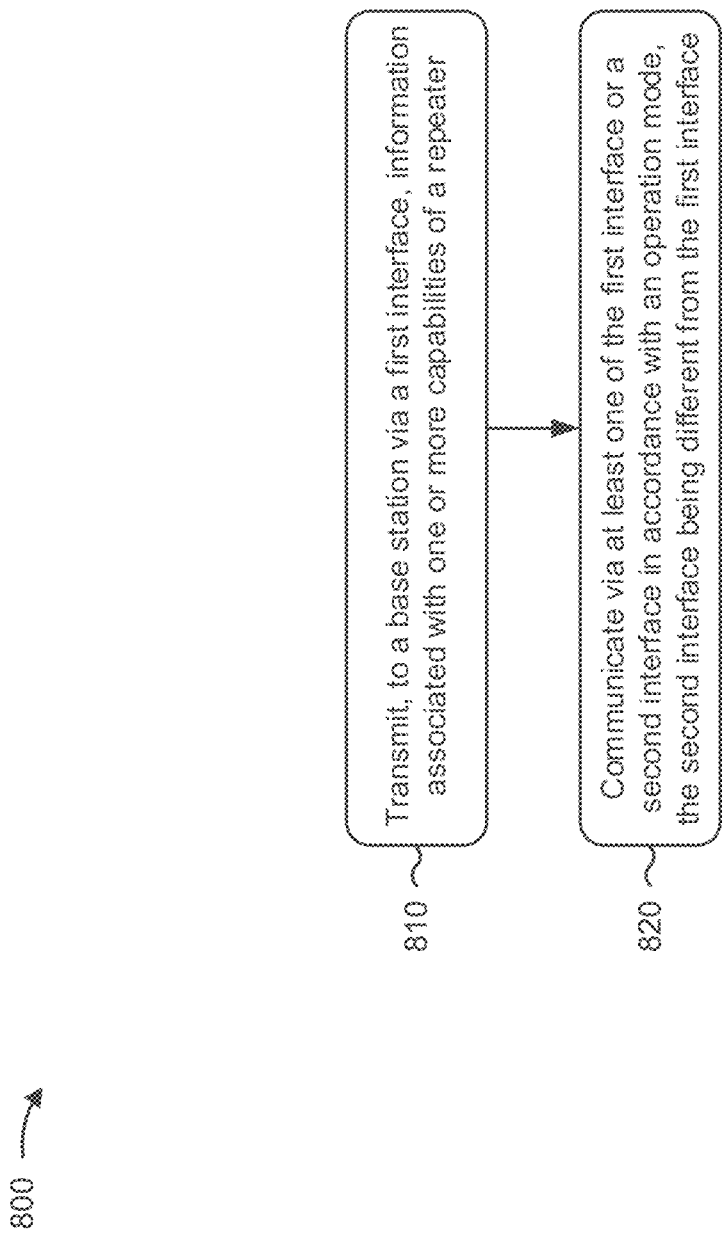

TIMING CONFIGURATION OF A LAYER-1 MILLIMETER WAVE REPEATER

CROSS-REFERENCE TO RELATED APPLICATION

This patent application claims priority to Provisional Patent Application No. 62/812,068, filed on Feb. 28, 2019, entitled "TIMING CONFIGURATION OF A LAYER-1 MILLIMETER WAVE REPEATER," and assigned to the assignee hereof. The disclosure of the prior application is considered part of and is incorporated by reference in this patent application.

INTRODUCTION

Aspects of the present disclosure generally relate to wireless communication, and more particularly to timing configuration for a millimeter wave repeater.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements may be applicable to other multiple access technologies and the telecommunication standards that employ these technologies.

SUMMARY

In some aspects, a method of wireless communication, performed by a base station, may include receiving, from a repeater having a first interface and a second interface, information associated with one or more capabilities of the repeater, the second interface being different from the first interface; determining an operation mode for the repeater based at least in part on the information associated with the one or more capabilities of the repeater, the operation mode being determined to be one of an asynchronous operation mode or a synchronous operation mode; and communicating with the repeater via at least one of the first interface or the second interface in accordance with the determined operation mode.

In some aspects, a method of wireless communication, performed by a repeater, may include transmitting, to a base station via a first interface, information associated with one or more capabilities of the repeater; and communicating via at least one of the first interface or a second interface in accordance with an operation mode, the second interface being different from the first interface, wherein the operation mode is one of an asynchronous operation mode or a synchronous operation mode.

In some aspects, a base station for wireless communication may include a memory and one or more processors coupled to the memory. The memory and the one or more processors may be configured to receive, from a repeater having a first interface and a second interface, information associated with one or more capabilities of the repeater, the second interface being different from the first interface; determine an operation mode for the repeater based at least in part on the information associated with the one or more capabilities of the repeater, the operation mode being determined to be one of an asynchronous operation mode or a synchronous operation mode; and communicate with the repeater via at least one of the first interface or the second interface in accordance with the determined operation mode.

In some aspects, a repeater for wireless communication may include a memory and one or more processors coupled to the memory. The memory and the one or more processors may be configured to transmit, to a base station via a first interface, information associated with one or more capabilities of the repeater; and communicate via at least one of the first interface or a second interface in accordance with an operation mode, the second interface being different from the first interface, wherein the operation mode is one of an asynchronous operation mode or a synchronous operation mode.

In some aspects, a non-transitory computer-readable medium may store one or more instructions for wireless communication. The one or more instructions, when executed by one or more processors of a base station, may cause the one or more processors to receive, from a repeater having a first interface and a second interface, information associated with one or more capabilities of the repeater, the second interface being different from the first interface; determine an operation mode for the repeater based at least in part on the information associated with the one or more capabilities of the repeater, the operation mode being determined to be one of an asynchronous operation mode or a synchronous operation mode; and communicate with the repeater via at least one of the first interface or the second interface in accordance with the determined operation mode.

In some aspects, a non-transitory computer-readable medium may store one or more instructions for wireless communication. The one or more instructions, when executed by one or more processors of a repeater, may cause the one or more processors to transmit, to a base station via a first interface, information associated with one or more capabilities of the repeater; and communicate via at least one of the first interface or a second interface in accordance with an operation mode, the second interface being different from the first interface, wherein the operation mode is one of an asynchronous operation mode or a synchronous operation mode.

In some aspects, an apparatus for wireless communication may include means for receiving, from a repeater having a first interface and a second interface, information associated with one or more capabilities of the repeater, the second interface being different from the first interface; means for determining an operation mode for the repeater based at least in part on the information associated with the one or more capabilities of the repeater, the operation mode being determined to be one of an asynchronous operation mode or a synchronous operation mode; and means for communicating with the repeater via at least one of the first interface or the second interface in accordance with the determined operation mode.

In some aspects, an apparatus for wireless communication may include means for transmitting, to a base station via a first interface, information associated with one or more capabilities of a repeater; and means for communicating via at least one of the first interface or a second interface in accordance with an operation mode, the second interface being different from the first interface, wherein the operation mode is one of an asynchronous operation mode or a synchronous operation mode.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes associated with timing configuration of a millimeter wave repeater, in accordance with various aspects of the present disclosure.

DETAILED DESCRIPTION

Figure 1:
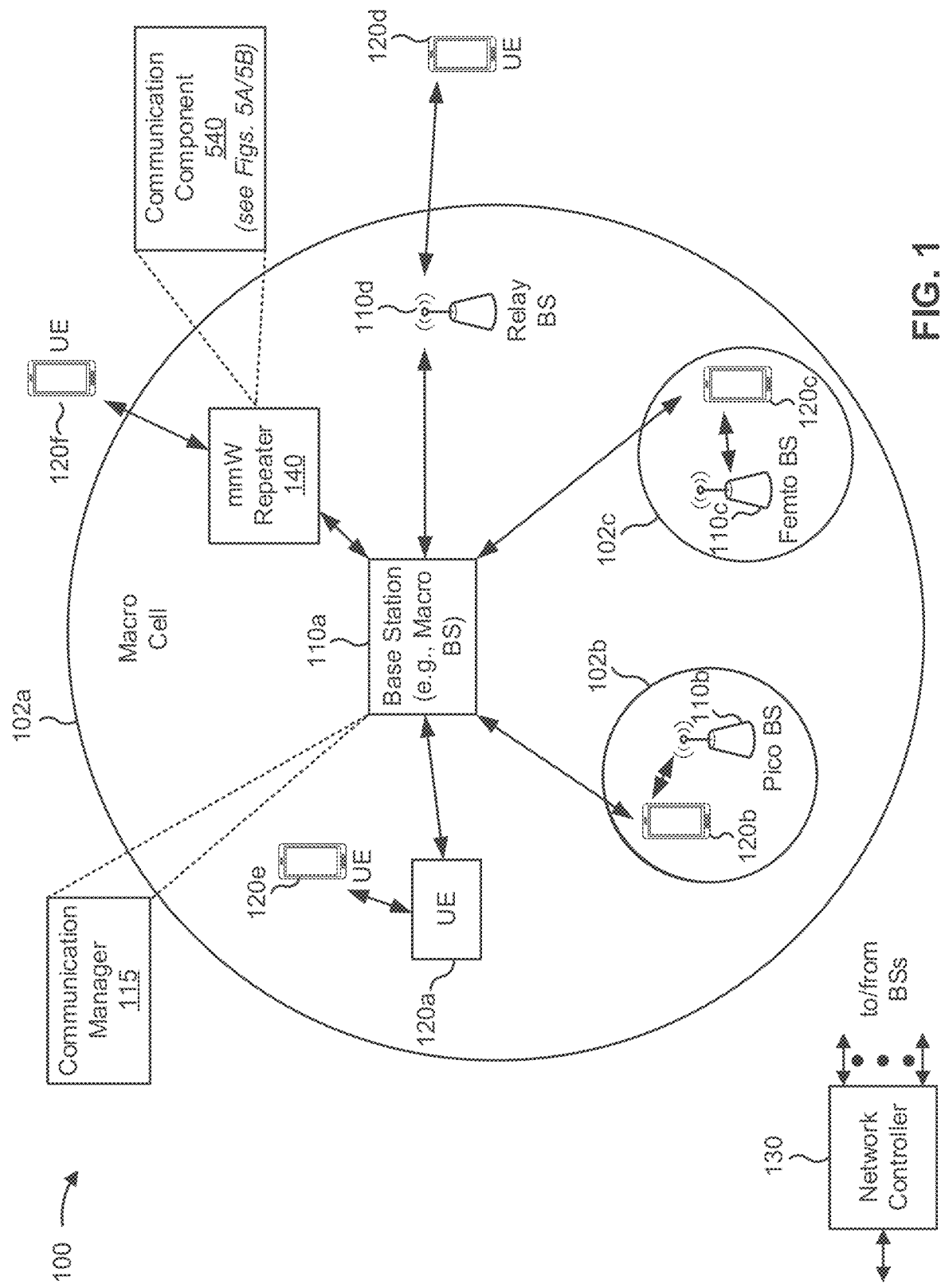
FIG. 1 is a block diagram conceptually illustrating an example of a wireless communication network, in accordance with various aspects of the present disclosure.

A mmW repeater may include components that enable receiving a signal on an RX antenna associated with a high frequency (HF) interface (e.g., a mmW interface), amplifying the power of the signal using a gain component, and transmitting the amplified signal on a TX antenna associated with the HF interface. These operations may be orchestrated and/or controlled by a controller. In some aspects, the mmW repeater may include a communication component that enables communication via a low frequency (LF) interface (e.g., an interface that uses a sub-6 gigahertz (GHz) frequency) for transmission or reception of information associated with such control signals (e.g., to or from one or more base stations).

At a given time, a mmW repeater may operate in an asynchronous operation mode or, if capable, a synchronous operation mode. The mmW repeater may have the capability to operate in the synchronous operation mode when the mmW repeater has an internal clock (e.g., based at least in part on a crystal oscillator associated with an LF interface) that is or can be synced to a clock of a base station, and can be used to set configurations of the HF interface of the mmW repeater. Notably, in some cases, accuracy of the internal clock of the mmW repeater may be limited (e.g., since a narrow-band signal may be for its synchronization), and hence may not be sufficiently accurate (e.g., at sample-level) for the HF interface. However, the accuracy of the internal clock may be sufficient for HF symbol-level synchronization. In the asynchronous mode of operation, a configuration setting of the HF interface may rely on (i.e., be triggered by) receipt of a control command (e.g., rather than based at least in part on a timing configuration included in the control command). In other words, operation in the asynchronous operation mode may cause the mmW repeater to implement a command upon receipt of the control command (e.g., such that the receipt of the control command is a trigger that causes the mmW repeater to implement the command).

Timing and synchronization capabilities may vary among mmW repeaters. For example, whether a given mmW repeater has the capability to operate in the synchronous mode of operation may vary among the mmW repeaters. Further, among those mmW repeaters having the capability to operate in the synchronous mode, capabilities of synchronous operation may vary. These timing and synchronization capabilities may be taken into account by a base station when the base station is to determine a timing configuration for a given mmW repeater. Some aspects described herein provide techniques and apparatuses for a timing configuration of a mmW repeater. In some aspects, a repeater may transmit, to a base station via a first interface (e.g., an LF interface), information associated with one or more capabilities of the repeater, where the repeater has the first interface and a second interface (e.g., an HF interface). In some aspects, the base station may receive the information associated with the one or more capabilities of the repeater, and may determine an operation mode for the repeater based at least in part on the information associated with the one or more capabilities of the repeater, where the operation mode is one of an asynchronous operation mode or a synchronous operation mode. In some aspects, the base station and the repeater may communicate via at least one of the first interface or the second interface in accordance with the operation mode.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e, 120f, and/or the like) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, millimeter wave (mmW) repeater 140 (sometimes referred to herein as a repeater 140) may receive an analog millimeter wave signal from a base station 110, may amplify the analog millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer-1 mmW repeater. Additionally, or alternatively, the repeater mmW 140 may be a wireless transmit receive point (TRP) acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

As shown in FIG. 1, the base station 110 may include a communication manager 115. As described in more detail elsewhere herein, the communication manager 115 may receive a report from mmW repeater 140 that includes a first interface and a second interface, the second interface being different from the first interface, and the report including information associated with timing and one or more synchronization capabilities of the repeater; determine an operation mode for mmW repeater 140 based at least in part on the report; and indicate the operation mode to the repeater via the first interface. Additionally, or alternatively, the communication manager 115 may perform one or more other operations described herein.

As indicated above, FIG. 1 is provided merely as an example. Other examples may differ from what is described with regard to FIG. 1.

Figure 2:
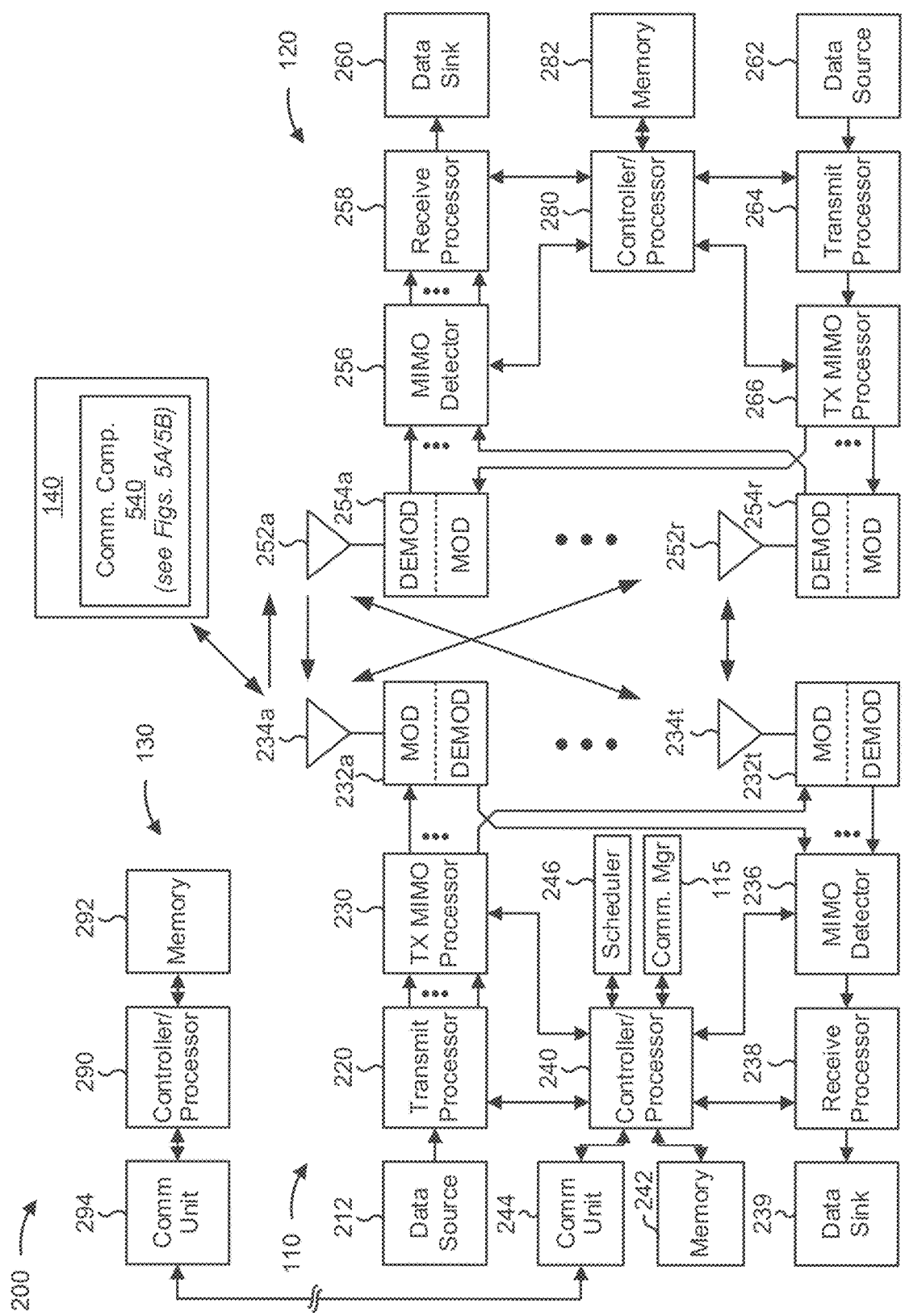
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110 and/or any other component(s) of FIG. 2 may perform one or more techniques associated with timing configuration for a mmW repeater, as described in more detail elsewhere herein. For example, controller/processor 240 of base station 110 and/or any other component(s) of FIG. 2 may perform or direct operations of, for example, process 700 of FIG. 7, process 800 of FIG. 8, and/or other processes as described herein. Memories 242 may store data and program codes for base station 110, respectively. A scheduler 246 may schedule UEs for data transmission on the downlink and/or uplink.

In some aspects, the base station 110 may include means for receiving, from mmW repeater 140 having a first interface and a second interface, information associated with one or more capabilities of the mmW repeater 140, the second interface being different from the first interface; means for determining an operation mode for mmW repeater 140 based at least in part on the information associated with the one or more capabilities of the mmW repeater 140, the operation mode being determined to be one of an asynchronous operation mode or a synchronous operation mode; means for communicating with the mmW repeater 140 via at least one of the first interface or the second interface in accordance with the determined operation mode; and/or the like. Additionally, or alternatively, the base station 110 may include means for performing one or more other operations described herein. In some aspects, such means may include the communication manager 115. In some aspects, such means may include one or more components of the base station 110 described in connection with FIG. 2.

As indicated above, FIG. 2 is provided merely as an example. Other examples may differ from what is described with regard to FIG. 2.

Figure 3:
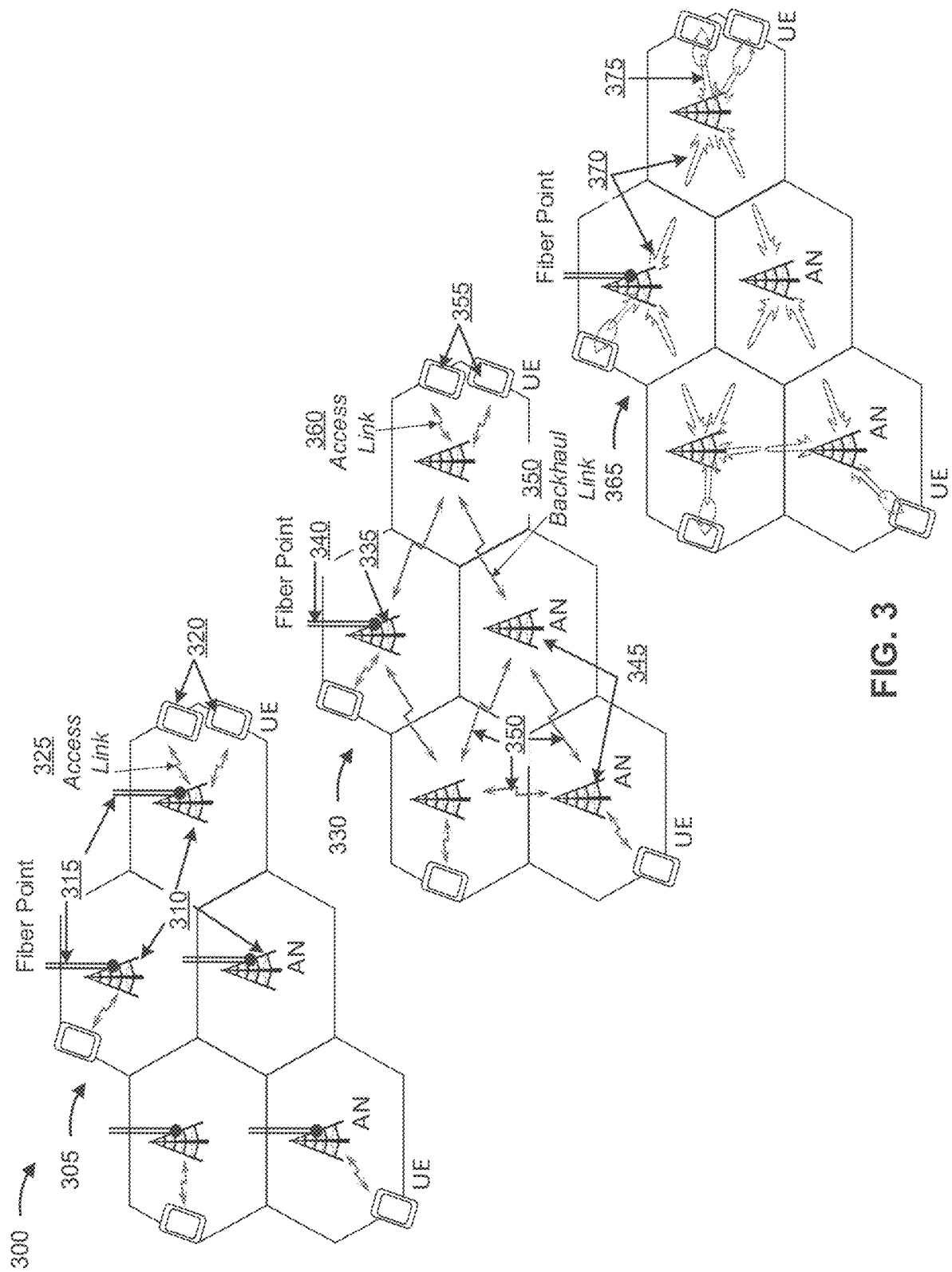
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
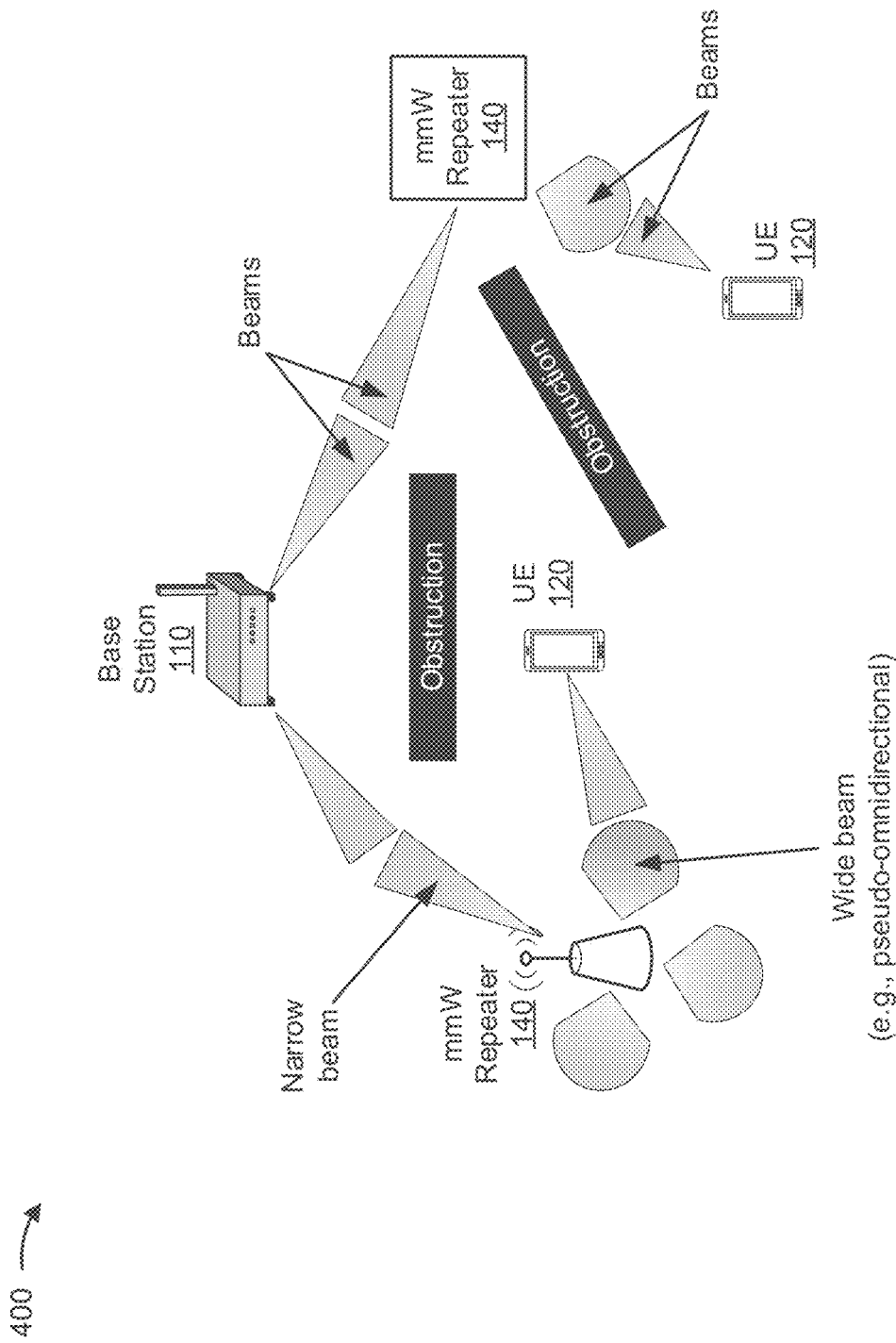
FIG. 4 is a diagram illustrating an example of communicating using a millimeter wave repeater, in accordance with various aspects of the present disclosure.

FIG. 4 is a diagram illustrating an example 400 of communicating using an analog millimeter wave repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 110 via a first beam (e.g., a backhaul beam over a backhaul link with the base station 110) and to communicate with a UE 120 via a second beam (e.g., an access beam over an access link with the UE 120). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may waste resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 110. As shown in FIG. 4, the millimeter wave repeater 140 may use a narrower beam to communicate with the base station 110 without unnecessarily consuming network resources and/or resources of the millimeter wave repeater 140 because the need for beam training, beam maintenance, and/or beam management may be limited, due to limited or no mobility of the base station 110 and the millimeter wave repeater 140 (and/or due to a line of sight communication path between the base station 110 and the millimeter wave repeater 140).

As further shown in FIG. 4, the millimeter wave repeater 140 may use a wider beam (e.g., a pseudo-omnidirectional beam and/or the like) to communicate with one or more UEs 120. This wider beam may provide wider coverage for access links, thereby providing coverage to mobile UEs 120 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities, resources of the base station 110 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 110 and the millimeter wave repeater 140.

In this way, the millimeter wave repeater 140 may increase a coverage area, provide access around obstructions (as shown), and/or the like, while conserving resources of the base station 110, resources of the millimeter wave repeater 140, network resources, and/or the like. Additional details are described below.

As indicated above, FIG. 4 is provided as an example. Other examples may differ from what is described with regard to FIG. 4.

Figure 5A:
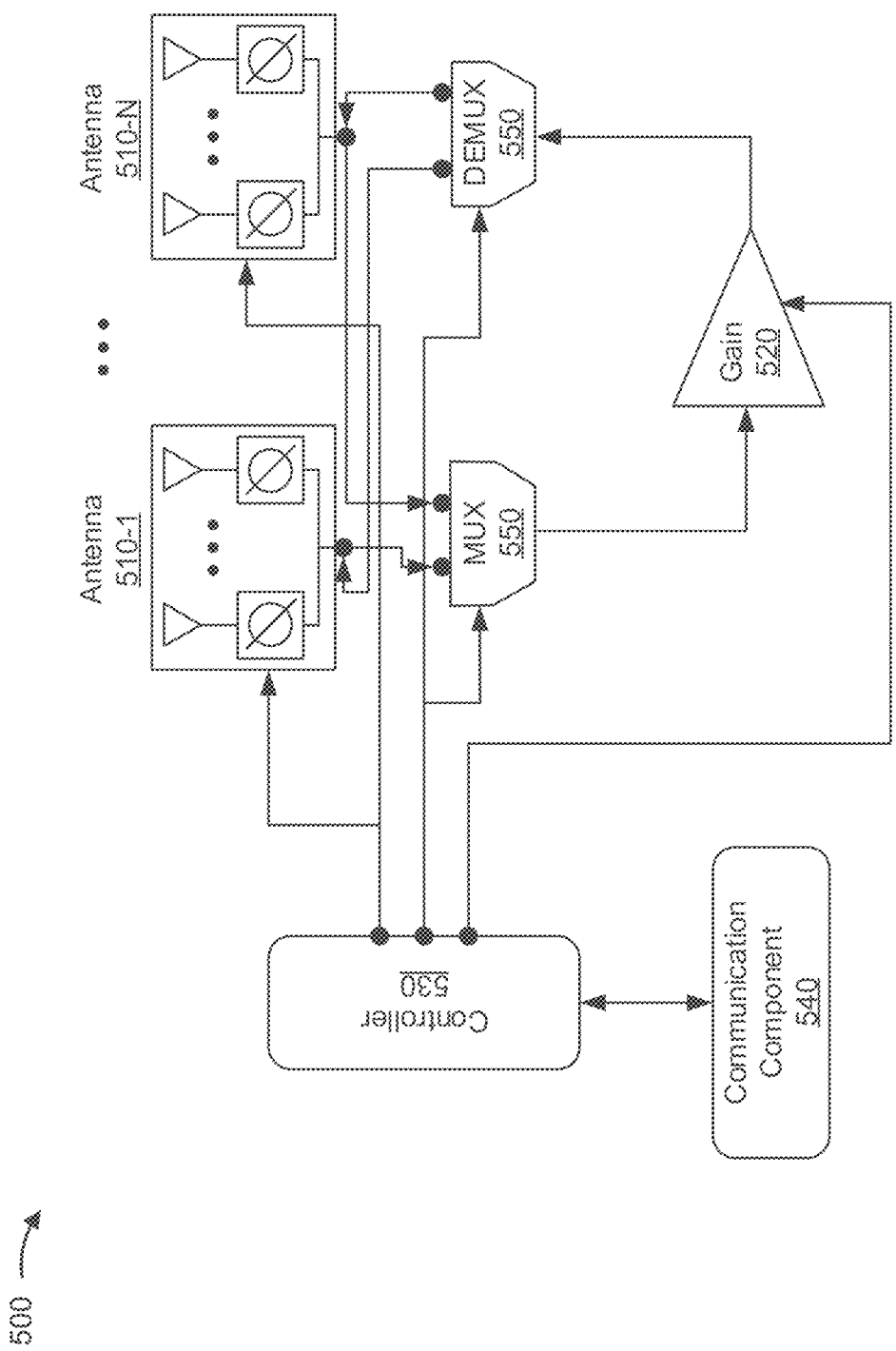
FIGS. 5A and 5B are diagrams illustrating example millimeter wave repeaters, in accordance with various aspects of the present disclosure.
Figure 5B:
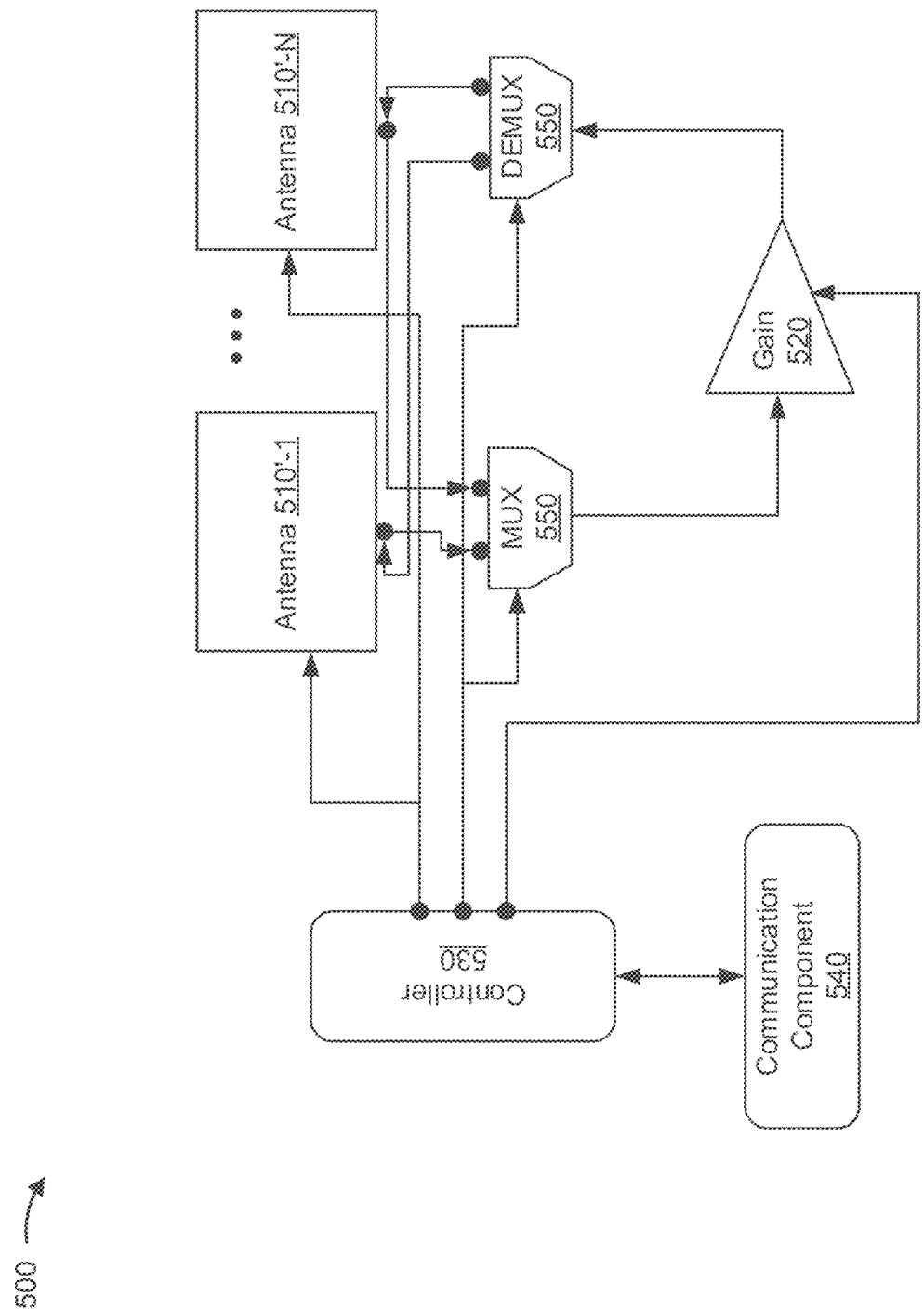

FIGS. 5A and 5B are diagrams illustrating examples of a millimeter wave repeater 500, in accordance with various aspects of the present disclosure. In some aspects, millimeter wave repeater 500 may correspond to millimeter wave repeater 140 shown in FIG. 1.

As shown in FIG. 5A, in some aspects, the millimeter wave repeater 500 may include one or more phased array antennas 510-1 through 510-N(N>1), a gain component 520, a controller 530, a communication component 540, and a multiplexer (MUX) and/or demultiplexer (DEMUX) (MUX/DEMUX) 550.

As shown in FIG. 5B, in some aspects, the millimeter wave repeater 500 may include one or more metamaterial antennas 510'-1 through 510'-N, gain component 520, controller 530, communication component 540, and one or more MUX/DEMUX 550.

An antenna 510/510' includes one or more antenna elements capable of being configured for beamforming. In some aspects, as illustrated in FIG. 5A, millimeter wave repeater 500 may include one or more phased array antennas 510, which may be referred to as a phased array because phase values and/or phase offsets of the antenna elements may be configured to form a beam, with different phase values and/or phase offsets being used for different beams (e.g., in different directions).

In some aspects, as illustrated in FIG. 5B, millimeter wave repeater 500 may include one or more metamaterial antennas 510'. In some aspects, a metamaterial antenna may comprise a synthetic material with negative permittivity and/or permeability, which yields a negative refractive index. Due to the resulting superior antenna gain and electro-magnetic lensing, the metamaterial antenna may not need to be used in a phased-array configuration. However, if in phased-array configuration, antenna spacing could be less than a typically used spacing of lambda/2, where lambda refers to a wavelength of the RF carrier signal. In some aspects, due to superior beamforming, the metamaterial antenna may reduce leakage back to the RX antenna and may reduce a chance of instability in the RF chain. Hence, the use of metamaterial antennas may reduce or obviate a need for a feedback path.

In some aspects, an antenna 510/510' may be a fixed receive (RX) antenna capable of only receiving communications, and not transmitting communications. In some aspects, an antenna 510/510' may be a fixed transmit (TX) antenna capable of only transmitting communications, and not receiving communications. In some aspects, an antenna 510/510' may be capable of being configured to act as an RX antenna or a TX antenna (e.g., via a TX/RX switch, a MUX/DEMUX, and/or the like). The antennas 510/510' may be capable of communicating using millimeter waves.

Gain component 520 includes a component capable of amplifying an input signal and outputting an amplified signal. For example, gain component 520 may include a power amplifier, a variable gain component, and/or the like. In some aspects, gain component 520 may have variable gain control. The gain component 520 may connect to an RX antenna (e.g., a first antenna 510/510'-1) and a TX antenna (e.g., a second antenna 510/510'-2) such that an analog millimeter wave signal, received via the RX antenna, can be amplified by the gain component 520 and output to the TX antenna for transmission. In some aspects, the level of amplification of the gain component 520 may be controlled by the controller 530.

Controller 530 includes a component capable of controlling one or more other components of the millimeter wave repeater 500. For example, the controller 530 may include a controller, a microcontroller, a processor, and/or the like. In some aspects, the controller 530 may control the gain component 520 by controlling a level of amplification or gain applied by the gain component 520 to an input signal. Additionally, or alternatively, the controller 530 may control an antenna 510/510' by controlling a beamforming configuration for the antenna 510/510' (e.g., one or more phase values for the antenna 510/510', one or more phase offsets for the antenna 510/510', one or more power parameters for the antenna 510/510', one or more beamforming parameters for the antenna 510/510', a TX beamforming configuration, an RX beamforming configuration, and/or the like), by controlling whether the antenna 510/510' acts as an RX antenna or a TX antenna (e.g., by configuring interaction and/or connections between the antenna 510/510' and a MUX/DEMUX 550), and/or the like. Additionally, or alternatively, the controller 530 may power on or power off one or more components of millimeter wave repeater 500 (e.g., when a base station 110 does not need to use the millimeter wave repeater to serve UEs 120). In some aspects, the controller 530 may control a timing of one or more of the above configurations.

Communication component 540 may include a component capable of wirelessly communicating with a base station 110 using a wireless technology other than millimeter wave. For example, the communication component 540 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a sub-6 GHz technology, a visible light communication technology, and/the like. In some aspects, the communication component 540 may use a lower frequency communication technology, and an antenna 510/510' may use a higher frequency communication technology (e.g., millimeter wave and/or the like). In some aspects, an antenna 510/510' may be used to transfer data between the millimeter wave repeater 500 and the base station 110, and the communication component 540 may be used to transfer control information between the millimeter wave repeater 500 and the base station 110 (e.g., a report, a configuration, instructions to power on or power off one or more components, and/or the like).

MUX/DEMUX 550 may be used to multiplex and/or demultiplex communications received from and/or transmitted to an antenna 510/510'. For example, MUX/DEMUX 550 may be used to switch an RX antenna to a TX antenna.

In some aspects, the millimeter wave repeater 500 does not include any components for digital signal processing. For example, the millimeter wave repeater 500 may not include a digital signal processor, a baseband processor, a digital-to-analog converter (DAC), an analog-to-digital converter (ADC), and/or the like. In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antennas 510/510', gain component 520, controller 530, communication component 540, MUX/DEMUX 550, and/or the like may perform one or more operations associated with timing configuration of the millimeter wave repeater 500, as described in more detail elsewhere herein. For example, one or more components of millimeter wave repeater 500 may perform or direct operations of, for example, process 700 of FIG. 7, process 800 of FIG. 8, and/or other processes as described herein.

In some aspects, millimeter wave repeater 500 may include means for transmitting, to base station 110 via a first interface, information associated with one or more capabilities of millimeter wave repeater 500; means for communicating via at least one of the first interface or a second interface in accordance with an operation mode, the second interface being different from the first interface, and wherein the operation mode is one of an asynchronous operation mode or a synchronous operation mode; and/or the like. In some aspects, such means may include one or more components of millimeter wave repeater 500 described in connection with FIGS. 5A and 5B.

As indicated above, FIGS. 5A and 5B are provided as examples. Other examples may differ from what is described with regard to FIGS. 5A and 5B. For example, millimeter wave repeater 500 may include additional components, fewer components, different components, or differently arranged components than those shown in FIGS. 5A and 5B. Furthermore, two or more components shown in FIGS. 5A and 5B may be implemented within a single component, or a single component shown in FIGS. 5A and 5B may be implemented as multiple components. Additionally, or alternatively, a set of components (e.g., one or more components) of millimeter wave repeater 500 may perform one or more functions described as being performed by another set of components of millimeter wave repeater 500.

As described above, a mmW repeater 140 may include components that enable receiving a signal on an RX antenna (e.g., antenna 510/510'-1) associated with a high frequency (HF) interface (e.g., a mmW interface), amplifying the power of the signal using gain component 520, and transmitting the amplified signal on a TX antenna (e.g., antenna 510/510'-2) associated with the HF interface. These operations may be orchestrated and/or controlled by controller 530. In some aspects, mmW repeater 140 may include communication component 540 that enables communication via an LF interface (e.g., an interface that uses a sub-6 GHz frequency) for transmission or reception of information associated with such control signals (e.g., to or from one or more base stations 110).

At a given time, mmW repeater 140 may operate in an asynchronous operation mode or, if capable, a synchronous operation mode. mmW repeater 140 may have the capability to operate in the synchronous operation when mmW repeater 140 has an internal clock (e.g., based at least in part on a crystal oscillator associated with an LF interface) that is or can be synced to a clock of base station 110, and can be used to set configurations of the HF interface of mmW repeater 140. Notably, in some cases, accuracy of the internal clock of mmW repeater 140 may be limited (e.g., since a narrow-band signal may be for its synchronization), and hence may not be sufficiently accurate (e.g., at sample-level) for the HF. However, the accuracy of the internal clock may be sufficient for HF symbol-level synchronization. In the asynchronous mode of operation, a configuration setting of the HF interface may rely on (i.e., be triggered by) receipt of a control command (e.g., rather than based at least in part on a timing configuration included in the control command).

Timing and synchronization capabilities may vary among mmW repeaters 140. For example, whether a given mmW repeater 140 has the capability to operate in the synchronous mode of operation may vary among mmW repeaters 140. Further, among those mmW repeaters 140 having the capability to operate in the synchronous mode, capabilities of synchronous operation may vary. These timing and synchronization capabilities may be taken into account by base station 110 when base station 110 is to determine a timing configuration for a given mmW repeater 140. Some aspects described herein provide techniques and apparatuses for a timing configuration of a mmW repeater 140.

Figure 6:
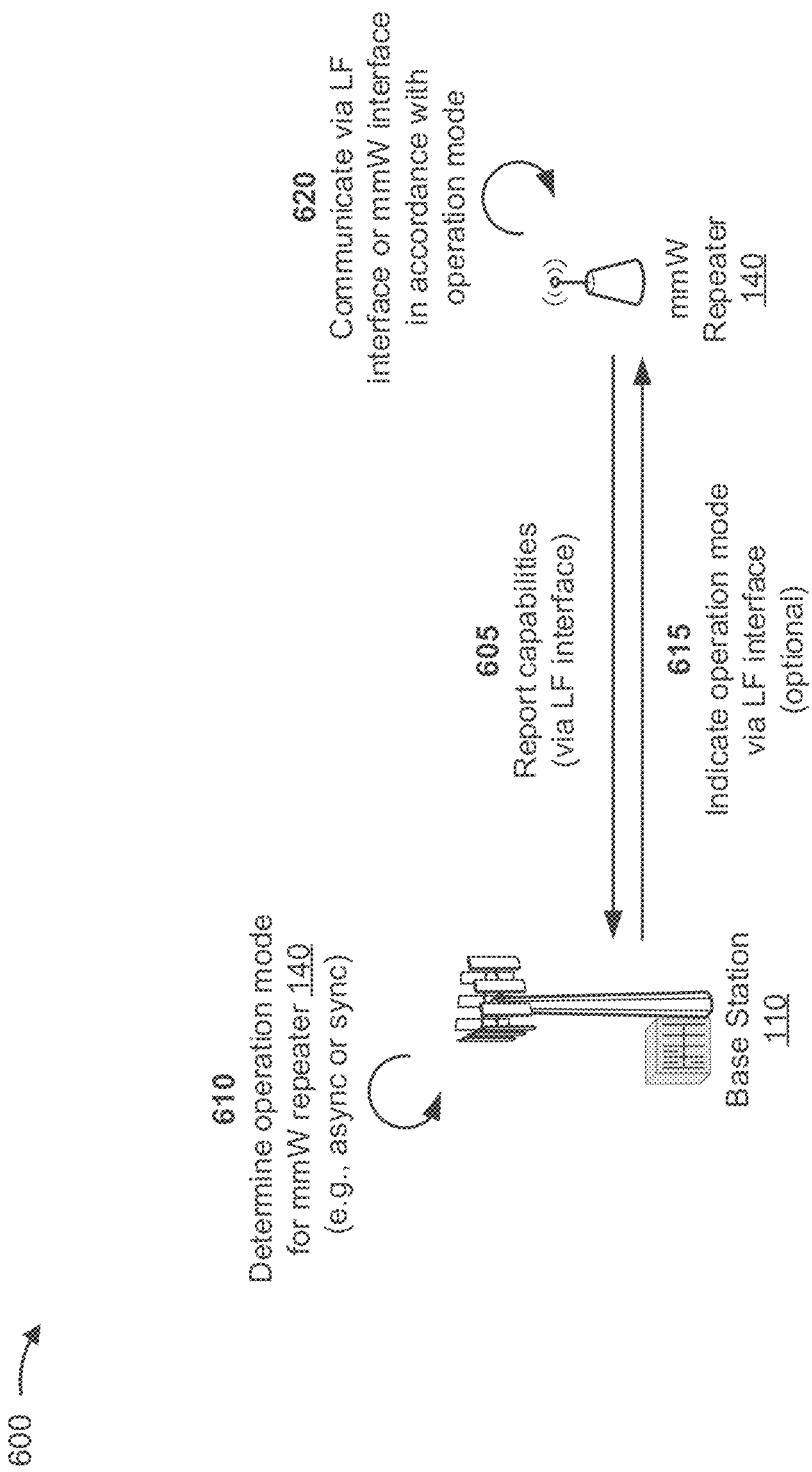
FIG. 6 is a diagram illustrating an example associated with timing configuration of a millimeter wave repeater, in accordance with various aspects of the present disclosure.

FIG. 6 is a diagram illustrating an example 600 of timing configuration for a mmW repeater 140, in accordance with various aspects of the present disclosure.

As shown in FIG. 6, and by reference number 605, mmW repeater 140 may transmit information associated with one or more capabilities of mmW repeater 140. In some aspects, the information associated with the one or more capabilities of mmW repeater 140 includes information associated with timing, one or more synchronization capabilities of the repeater, or some combination thereof. In some aspects, mmW repeater 140 may transmit the information associated with the one or more capabilities via an LF interface of mmW repeater 140.

In some aspects, mmW repeater 140 may transmit the information associated with the one or more capabilities based at least in part on a request transmitted by base station 110. For example, base station 110 may transmit, to mmW repeater 140 and via an LF interface of base station 110, a request for the information associated with the one or more capabilities of mmW repeater 140. Here, mmW repeater 140 may receive the request via the LF interface of mmW repeater 140, and may transmit the information associated with the one or more capabilities based at least in part on receiving the request.

In some aspects, mmW repeater 140 may transmit the information associated with the one or more capabilities after establishing a connection between mmW repeater 140 and base station 110. For example, mmW repeater 140 and base station 110 may establish a connection via their respective LF interfaces, and mmW repeater 140 may transmit the information associated with the one or more capabilities via the LF interface of the mmW repeater 140 after the connection is established.

In some aspects, the information associated with the one or more capabilities includes an indication of whether mmW repeater 140 can support synchronous operation. In other words, the information associated with the one or more capabilities may include an indication of whether mmW repeater 140 has the capability to operate in the synchronous mode of operation. In some aspects, when mmW repeater 140 has the capability to operate in the synchronous mode, the information associated with the one or more capabilities may include information indicating an accuracy level of synchronicity (e.g., information indicating accuracy of the internal clock of mmW repeater 140 in terms of, for example, an HF sampling rate).

In some aspects, when mmW repeater 140 has the capability to operate in the synchronous mode, the information associated with the one or more capabilities may include information indicating whether the internal clock of mmW repeater 140 can be tuned.

In some aspects, the information associated with the one or more capabilities includes information that identifies a processing time for a procedure performed by mmW repeater 140. In some aspects, the processing time is associated with the LF interface of mmW repeater 140 and the HF interface of mmW repeater 140 (e.g., the processing time may be a sum of processing times associated with the LF interface and the HF interface, a maximum of processing times associated with the LF interface and the HF interface, a minimum of processing times associated with the LF interface and the HF interface, and/or the like). In some aspects, the processing time may be procedure-specific (e.g., different HF procedures may have different processing times). For example, the information associated with the one or more capabilities may include information that identifies a first processing time for changing a beamforming configuration, a second processing time for setting a power level gain, a third processing time for switching TX/RX directions, and so on.

As further shown in FIG. 6, base station 110 may receive the information associated with the one or more capabilities and, as shown by reference number 610, may determine an operation mode for mmW repeater 140 based at least in part on the information associated with the one or more capabilities. For example, base station 110 may receive the information associated with the one or more capabilities and, based at least in part on the information associated with the one or more capabilities of mmW repeater 140, may select an operation mode for mmW repeater 140. In some aspects, the operation mode is the asynchronous operation mode. In some aspects, the operation mode is the synchronous operation mode.

As further shown in FIG. 6, and by reference number 615, base station 110 may, in some aspects, indicate the operation mode to mmW repeater 140 via the LF interface of the mmW repeater 140.

In some aspects, base station 110 may explicitly indicate the operation mode to mmW repeater 140. For example, base station 110 may transmit, to mmW repeater 140, a control command including information that identifies the operation mode for an upcoming communication (e.g., such that the operation mode is semi-statically configured). As another example, base station 110 may dynamically set the operation mode of mmW repeater 140. As a particular example, assuming that mmW repeater 140 supports both synchronous and asynchronous operation modes, base station 110 may provide a control command to set a configuration of an HF interface of mmW repeater 140. Here, base station 110 can also indicate an associated timing configuration that identifies the operation mode, such as whether the configuration for the HF interface is to be set immediately after mmW repeater 140 receives the control command (i.e., indicating that mmW repeater 140 is to operate in the asynchronous mode) or in accordance with a particular timeline (i.e., indicating that mmW repeater 140 is to operate in the synchronous mode).

In some aspects, base station 110 may implicitly indicate the operation mode to mmW repeater 140. For example, mmW repeater 140 may be configured with a default operation mode (e.g., asynchronous). Here, mmW repeater 140 may operate in the default operation mode until base station 110 explicitly configures or changes the operation mode. Thus, base station 110 can implicitly indicate the operation mode by providing a control command (e.g., a control command including information associated with a configuration for the HF interface of mmW repeater 140) that does not include information indicating the operation mode.

In some aspects, as described above, base station 110 may indicate the operation mode by communicating a control command to mmW repeater 140 via the LF interface. In some aspects, the control command may include a timing configuration field, and the operation mode may be indicated in the timing configuration field of the control command, as described below. In some aspects, the control command may include other information, such as information associated with a configuration for the HF interface of mmW repeater 140.

In some aspects, when the operation mode is the synchronous operation mode, the timing configuration field may identify a start time (e.g., a time at which mmW repeater 140 is to start applying a configuration included in the control command). In some aspects, the start time may be an absolute start time. For example, the start time may identify a particular time-domain resource at which mmW repeater 140 is to begin applying a configuration included in the control command. In some aspects, the absolute start time may have a granularity at an LF symbol-level. Additionally, or alternatively, the start time may be an offset with respect to a receipt time of the control command. For example, the start time may identify an amount of time from receipt of the control command after which mmW repeater 140 is to begin applying a configuration included in the control command.

In some aspects, when the operation mode is the synchronous operation mode, the timing configuration may identify a duration. The duration may identify, for example, an amount of time that mmW repeater 140 is to apply the configuration included in the control command (e.g., an amount of time that mmW repeater 140 is to apply configuration starting at the start time). In some aspects, when the operation mode is the synchronous operation mode, the duration may be indefinite (e.g., such that mmW repeater 140 applies the configuration until a different timing configuration is received).

In some aspects, when the operation mode is the synchronous operation mode, the timing configuration may identify a periodicity. The periodicity may identify, for example, a periodicity at which mmW repeater 140 is to apply the configuration included in the control command.

In some aspects, when the operation mode is the synchronous operation mode, the timing configuration may identify a bitmap. The bitmap may identify, for example, particular sets of time-domain resources during which mmW repeater 140 is to apply the configuration included in the control command and/or particular sets of time-domain resources during which mmW repeater 140 is not to apply the configuration included in the control command. In some aspects, the bit map may have a granularity at a system frame level or half-frame level. In some aspects, the bitmap may have an associated periodicity (e.g., a periodicity at which the bitmap is to be applied).

As shown in FIG. 6, in some aspects, mmW repeater 140 may receive the indication of the operation mode and, as shown by reference number 620, may communicate via the HF interface or the LF interface according to the operation mode (e.g., based at least in part on the timing configuration included in the control command). For example, mmW repeater 140 may receive the indication of the operation mode, and may further communicate (e.g., transmit information, receive information, forward a signal, and/or the like) over the HF interface in accordance with the operation mode.

In some aspects, base station 110 may not indicate the operation mode to mmW repeater 140. In such a case, mmW repeater 140 may determine the operation mode to be used by mmW repeater 140 (e.g., based at least in part on the one or more capabilities of mmW repeater 140), and may operate in the determined operation mode (without an indication from base station 110).

In some aspects, base station 110 may communicate with mmW repeater 140 via the LF interface or the HF interface in accordance with the operation mode and processing capabilities of mmW repeater 140.

As indicated above, FIG. 6 is provided as an example. Other examples may differ from what is described with respect to FIG. 6.

FIG. 7 is a diagram illustrating an example process 700 performed, for example, by a base station, in accordance with various aspects of the present disclosure. Example process 700 is an example where a base station (e.g., base station 110) performs operations associated with timing configuration for a repeater (e.g., mmW repeater 140).

As shown in FIG. 7, in some aspects, process 700 may include receiving, from a repeater having a first interface and a second interface, information associated with one or more capabilities of the repeater, the second interface being different from the first interface (block 710). For example, the base station (e.g., using antenna 234, receive processor 238, controller/processor 240, and/or the like) may receive, from a repeater having a first interface and a second interface, information associated with one or more capabilities of the repeater, as described above. In some aspects, the report may include information associated with timing and one or more synchronization capabilities of the repeater. In some aspects, the second interface may be different from the first interface.

As further shown in FIG. 7, in some aspects, process 700 may include determining an operation mode for the repeater based at least in part on the information associated with the one or more capabilities of the repeater (block 720). For example, the base station (e.g., using controller/processor 240, memory 242, and/or the like) may determine an operation mode for the repeater based at least in part on the information associated with one or more capabilities of the repeater, as described above. In some aspects, the operation mode may be determined to be one of an asynchronous operation mode or a synchronous operation mode.

As further shown in FIG. 7, in some aspects, process 700 may include communicating with the repeater via at least one of the first interface or the second interface in accordance with the determined operation mode (block 730). For example, the base station (e.g., using antenna 234, transmit processor 220, controller/processor 240, and/or the like) may communicate with the repeater via at least one of the first interface or the second interface in accordance with the determined operation mode, as described above.

Process 700 may include additional aspects, such as any single aspect or any combination of aspects described below and/or in connection with one or more other processes described elsewhere herein.

In a first aspect, the base station may establish a connection with the repeater via the first interface.

In a second aspect, alone or in combination with the first aspect, the first interface is a low frequency interface and the second interface is a millimeter wave interface. In a third aspect, alone or in combination with one or more of the first and second aspects, the information associated with the one or more capabilities includes an indication of whether the repeater can support synchronous operation.

In a fourth aspect, alone or in combination with one or more of the first through third aspects, the information associated with the one or more capabilities includes an indication of an accuracy level of synchronization.

In a fifth aspect, alone or in combination with one or more of the first through fourth aspects, the information associated with the one or more capabilities includes information that identifies a processing time for a procedure performed by the repeater.

In a sixth aspect, alone or in combination with one or more of the first through fifth aspects, the base station may transmit, to the repeater, a request for the information associated with one or more capabilities of the repeater.

In a seventh aspect, alone or in combination with one or more of the first through sixth aspect, the base station may indicate the operation mode to the repeater via the first interface.

In an eighth aspect, alone or in combination with one or more of the first through seventh aspects, the operation mode is indicated by communicating a control command to the repeater via the first interface, the control command including an indication of the operation mode.

In a ninth aspect, alone or in combination with one or more of the first through eighth aspects, the operation mode is explicitly indicated by the base station.

In a tenth aspect, alone or in combination with one or more of the first through ninth aspects, the operation mode is implicitly indicated by the base station.

In an eleventh aspect, alone or in combination with one or more of the first through tenth aspects, the operation mode is indicated in a timing configuration field of a control command.

In a twelfth aspect, alone or in combination with one or more of the first through eleventh aspects, timing configuration field identifies a start time of synchronous operation when the operation mode is a synchronous operation mode.

In a thirteenth aspect, alone or in combination with one or more of the first through twelfth aspects, the start time is an absolute start time.

In a fourteenth aspect, alone or in combination with one or more of the first through thirteenth aspects, the start time is an offset with respect to a receipt time of the control command.

In a fifteenth aspect, alone or in combination with one or more of the first through fourteenth aspects, the timing configuration field identifies a duration of synchronous operation when the operation mode is a synchronous operation mode.

In a sixteenth aspect, alone or in combination with one or more of the first through fifteenth aspects, the timing configuration field identifies a periodicity of synchronous operation when the operation mode is a synchronous operation mode.

In a seventeenth aspect, alone or in combination with one or more of the first through sixteenth aspects, the timing configuration identifies a bitmap associated with synchronous operation when the operation mode is a synchronous operation mode.

In an eighteenth aspect, alone or in combination with one or more of the first through seventeenth aspects, the communication is based at least in part on a beamforming configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a repeater, in accordance with various aspects of the present disclosure. Example process 800 is an example where a repeater (e.g., mmW repeater 140) performs operations associated with timing configuration of the repeater.

As shown in FIG. 8, in some aspects, process 800 may include transmitting, to a base station (e.g., base station 110) via a first interface, information associated with one or more capabilities of the repeater (block 810). For example, the repeater (e.g., using controller 530, communication component 540, and/or the like) may transmit, to a base station via a first interface, information associated with one or more capabilities of the repeater, as described above. In some aspects, the report may include information associated with timing and one or more synchronization capabilities of the repeater.

As further shown in FIG. 8, in some aspects, process 800 may include communicating via at least one of the first interface or a second interface in accordance with an operation mode, the second interface being different from the first interface (block 820). For example, the repeater (e.g., using controller 530, communication component 540, antenna 510/510', and/or the like) may communicate via at least one of the first interface or a second interface in accordance with an operation mode, as described above. In some aspects, the second interface may be different from the first interface. In some aspects, the operation mode is one of an asynchronous operation mode or a synchronous operation mode.

Process 800 may include additional aspects, such as any single aspect or any combination of aspects described below and/or in connection with one or more other processes described elsewhere herein.

In a first aspect, the repeater may establish a connection with the base station via the first interface.

In a second aspect, alone or in combination with the first aspect, the first interface is a low frequency interface and the second interface is a millimeter wave interface.

In a third aspect, alone or in combination with one or more of the first and second aspects, the asynchronous operation mode is to cause the repeater to implement a command upon receipt of the command.

In a fourth aspect, alone or in combination with one or more of the first through third aspects, the information associated with the one or more capabilities includes an indication of whether the repeater can support synchronous operation.

In a fifth aspect, alone or in combination with one or more of the first through fourth aspects, the information associated with the one or more capabilities includes information that identifies a processing time for a procedure performed by the repeater.

In a sixth aspect, alone or in combination with one or more of the first through fifth aspects, the repeater may receive, from the base station, a request for the information associated with one or more capabilities of the repeater.

In a seventh aspect, alone or in combination with one or more of the first through sixth aspects, the repeater may receive an indication of the operation mode for the repeater.

In an eighth aspect, alone or in combination with one or more of the first through seventh aspects, the operation mode is indicated in a control command received via the first interface, the control command including an indication of the operation mode.

In a ninth aspect, alone or in combination with one or more of the first through eighth aspects, the operation mode is explicitly indicated to the repeater.

In a tenth aspect, alone or in combination with one or more of the first through ninth aspects, the operation mode is implicitly indicated to the repeater.

In an eleventh aspect, alone or in combination with one or more of the first through tenth aspects, the operation mode is indicated in a timing configuration field of a control command.

In a twelfth aspect, alone or in combination with one or more of the first through eleventh aspects, the timing configuration identifies a start time of synchronous operation when the operation mode is a synchronous operation mode.

In a thirteenth aspect, alone or in combination with one or more of the first through twelfth aspects, the start time is an absolute start time.

In a fourteenth aspect, alone or in combination with one or more of the first through thirteenth aspects, the start time is an offset with respect to a receipt time of the control command.

In a fifteenth aspect, alone or in combination with one or more of the first through fourteenth aspects, the timing configuration identifies a duration of synchronous operation when the operation mode is a synchronous operation mode.

In a sixteenth aspect, alone or in combination with one or more of the first through fifteenth aspects, the timing configuration identifies a periodicity of synchronous operation when the operation mode is a synchronous operation mode.

In a seventeenth aspect, alone or in combination with one or more of the first through sixteenth aspects, the timing configuration identifies a bitmap associated with synchronous operation when the operation mode is a synchronous operation mode.

In a eighteenth aspect, alone or in combination with one or more of the first through seventeenth aspects, the communication is based at least in part on a beamforming configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold, depending on the context, may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:
1. A method of wireless communication performed by a network node, comprising:
    receiving, from a repeater having a first interface and a second interface, information associated with one or more capabilities of the repeater,
        the second interface being different from the first interface;

determining an operation mode for the repeater based at least in part on the information associated with the one or more capabilities of the repeater,
the operation mode being determined to be one of an asynchronous operation mode or a synchronous operation mode; and
indicating the operation mode to the repeater by communicating a control command via the first interface before communicating with the repeater via the second interface in accordance with the operation mode, wherein when the operation mode is the asynchronous operation mode, the control command includes information associated with a configuration of the second interface, the configuration of the second interface being triggered by a receipt of the control command, and when the operation mode is the synchronous operation mode, the operation mode is indicated to the repeater in a timing configuration field of the control command.

2. The method of claim 1, wherein the first interface is an interface that uses a sub-6 gigahertz (GHz) frequency and the second interface is a millimeter wave interface.

3. The method of claim 1, wherein the information associated with the one or more capabilities of the repeater includes information associated with timing, one or more synchronization capabilities of the repeater, or some combination thereof.

4. The method of claim 1, wherein the information associated with the one or more capabilities includes an indication of whether the repeater can support synchronous operation.

5. The method of claim 1, wherein the information associated with the one or more capabilities includes an indication of an accuracy level of synchronization.

6. The method of claim 1, wherein the information associated with the one or more capabilities includes information that identifies a processing time for a procedure performed by the repeater.

7. The method of claim 1, wherein the timing configuration field identifies a start time of synchronous operation when the operation mode is the synchronous operation mode.

8. The method of claim 7, wherein the start time is one of an absolute start time or an offset with respect to a receipt time of the control command.

9. The method of claim 1, wherein the timing configuration field identifies at least one of:
a duration of synchronous operation when the operation mode is the synchronous operation mode,
a periodicity of the synchronous operation when the operation mode is the synchronous operation mode, or
a bitmap associated with the synchronous operation when the operation mode is the synchronous operation mode.

10. The method of claim 1, wherein the communicating with the repeater is based at least in part on a beamforming configuration.

11. A method of wireless communication performed by a repeater, comprising:
transmitting, to a network node via a first interface, information associated with one or more capabilities of the repeater; and
receiving, from the network node and via the first interface, an indication of an operation mode for the repeater by a control command before communicating with the network node via a second interface in accordance with the operation mode, the second interface being different from the first interface,
wherein the operation mode is one of an asynchronous operation mode or a synchronous operation mode, and wherein when the operation mode is the asynchronous operation mode, the control command includes information associated with a configuration of the second interface, the configuration of the second interface being triggered by a receipt of the control command, and when the operation mode is the synchronous operation mode, the indication of the operation mode is included in a timing configuration field of the control command.

12. The method of claim 11, wherein the first interface is an interface that uses a sub-6 gigahertz (GHz) frequency and the second interface is a millimeter wave interface.

13. The method of claim 11, wherein the information associated with the one or more capabilities of the repeater includes information associated with timing, one or more synchronization capabilities of the repeater, or some combination thereof.

14. The method of claim 11, wherein the information associated with the one or more capabilities includes an indication of whether the repeater can support synchronous operation.

15. The method of claim 11, wherein the information associated with the one or more capabilities includes information that identifies a processing time for a procedure performed by the repeater.

16. The method of claim 11, wherein the timing configuration field identifies a start time of synchronous operation when the operation mode is the synchronous operation mode, and
wherein the start time is an absolute start time or an offset with respect to a receipt time of the control command.

17. The method of claim 11, wherein the timing configuration field identifies at least one of:
a duration of synchronous operation when the operation mode is the synchronous operation mode,
a periodicity of the synchronous operation when the operation mode is the synchronous operation mode, or
a bitmap associated with the synchronous operation when the operation mode is the synchronous operation mode.

18. The method of claim 11, wherein the communicating with the network node is based at least in part on a beamforming configuration.

19. A network node for wireless communication, comprising:
a memory; and
one or more processors coupled to the memory, the one or more processors configured to:
receive, from a repeater having a first interface and a second interface, information associated with one or more capabilities of the repeater,
the second interface being different from the first interface;
determine an operation mode for the repeater based at least in part on the information associated with the one or more capabilities of the repeater,
the operation mode determined to be one of an asynchronous operation mode or a synchronous operation mode; and
indicate the operation mode to the repeater by communicating a control command via the first interface before communicating with the repeater via the second interface in accordance with the operation mode, wherein when the operation mode is the asynchronous operation mode, the control command includes information associated with a configuration of the second interface and the configuration of the second interface is triggered by a receipt of the control command, and when the operation mode is the synchronous operation mode, the operation mode is indicated to the repeater in a timing configuration field of the control command.

20. A repeater for wireless communication, comprising:
a memory; and
one or more processors coupled to the memory, the one or more processors configured to:
   transmit, to a network node via a first interface, information associated with one or more capabilities of the repeater; and
   receive, from the network node and via the first interface, an indication of an operation mode for the repeater by a control command before communicating with the network node via second interface in accordance with the operation mode, the second interface being different from the first interface,
      wherein the operation mode is one of an asynchronous operation mode or a synchronous operation mode, and wherein when the operation mode is the asynchronous operation mode, the control command includes information associated with a configuration of the second interface and the configuration of the second interface is triggered by a receipt of the control command, and when the operation mode is the synchronous operation mode, the indication of the operation mode is included in a timing configuration field of the control command.

21. The network node of claim 19, further comprising:
one or more antennas coupled to the memory and the one or more processors, wherein, when the operation mode is the synchronous operation mode, the repeater has an internal clock that is configured to be synchronized to a clock of the network node and to be used to set the configuration of the second interface.

22. The network node of claim 19, wherein the timing configuration field identifies a start time of synchronous operation when the operation mode is the synchronous operation mode.

23. The network node of claim 22, wherein the start time is one of an absolute start time or an offset with respect to a receipt time of the control command.

24. The repeater of claim 20, wherein, when the operation mode is the synchronous operation mode, the repeater has an internal clock that is configured to be synchronized to a clock of the network node and to be used to set the configuration of the second interface.

25. The repeater of claim 20, wherein the timing configuration field identifies a start time of synchronous operation when the operation mode is the synchronous operation mode.

26. The repeater of claim 25, wherein the start time is an absolute start time or an offset with respect to a receipt time of the control command.

27. The repeater of claim 20, wherein the repeater is a millimeter wave repeater.

28. The repeater of claim 20, further comprising:
one or more metamaterial antennas, wherein the one or more metamaterial antennas comprise a synthetic material with negative permittivity.

29. The repeater of claim 20, further comprising:
one or more metamaterial antennas, wherein the one or more metamaterial antennas comprise a synthetic material with permeability.

30. The repeater of claim 20, further comprising:
one or more metamaterial antennas, wherein the one or more metamaterial antennas comprise a synthetic material with negative permittivity and permeability.

31. The repeater of claim 20, further comprising:
one or more metamaterial antennas, wherein the one or more metamaterial antennas comprise one or more of the first interface or the second interface.

32. A non-transitory computer-readable medium storing one or more instructions for wireless communication, the one or more instructions comprising:
one or more instructions that, when executed by one or more processors of a network node, cause the network node to:
   receive, from a repeater having a first interface and a second interface, information associated with one or more capabilities of the repeater,
      the second interface being different from the first interface;
   determine an operation mode for the repeater based at least in part on the information associated with the one or more capabilities of the repeater,
      the operation mode being determined to be one of an asynchronous operation mode or a synchronous operation mode; and
   indicate the operation mode to the repeater by communicating a control command via the first interface before communicating with the repeater via the second interface in accordance with the operation mode, wherein when the operation mode is the asynchronous operation mode, the control command includes information associated with a configuration of the second interface and the configuration of the second interface is triggered by a receipt of the control command, and when the operation mode is the synchronous operation mode, the operation mode is indicated to the repeater in a timing configuration field of the control command.

33. The non-transitory computer-readable medium of claim 32, wherein, when the operation mode is the synchronous operation mode, the repeater has an internal clock that is configured to be synchronized to a clock of the network node and to be used to set the configuration of the second interface.

34. The non-transitory computer-readable medium of claim 32, wherein the timing configuration field identifies a start time of synchronous operation when the operation mode is the synchronous operation mode.

35. The non-transitory computer-readable medium of claim 34, wherein the start time is one of an absolute start time or an offset with respect to a receipt time of the control command.

36. A non-transitory computer-readable medium storing one or more instructions for wireless communication, the one or more instructions comprising:
one or more instructions that, when executed by one or more processors of a repeater, cause the repeater to:
   transmit, to a network node via a first interface, information associated with one or more capabilities of the repeater; and
   receive, from the network node and via the first interface, an indication of an operation mode for the repeater in a control command before communicating with the network node via a second interface in accordance with the operation mode, the second interface being different from the first interface, wherein the operation mode is one of an asynchronous operation mode or a synchronous operation mode, and wherein when the operation mode is the asynchronous operation mode, the control command includes information associated with a configuration of the second interface and the configuration of the second interface is triggered by a receipt of the control command, and when the operation mode is the synchronous operation mode, the operation mode is indicated to the repeater in a timing configuration field of the control command.

37. The non-transitory computer-readable medium of claim 36, wherein, when the operation mode is the synchronous operation mode, the repeater has an internal clock that is configured to be synchronized to a clock of the network node and to be used to set the configuration of the second interface.

38. The non-transitory computer-readable medium of claim 36, wherein the timing configuration field identifies a start time of synchronous operation when the operation mode is the synchronous operation mode.

39. The non-transitory computer-readable medium of claim 38, wherein the start time is an absolute start time or an offset with respect to a receipt time of the control command.

40. A method for wireless communication at a network node, comprising:
receiving, from a repeater having a first interface and a second interface, information associated with one or more capabilities of the repeater, the second interface being different from the first interface;
determining an operation mode for the repeater based at least in part on the information associated with the one or more capabilities of the repeater, the operation mode determined to be one of an asynchronous operation mode or a synchronous operation mode; and
indicating the operation mode to the repeater via the first interface before communicating with the repeater via the second interface in accordance with the operation mode, the operation mode indicated to the repeater in a timing configuration field of a control command, wherein the timing configuration field identifies a start time of synchronous operation when the operation mode is the synchronous operation mode, and wherein the start time is one of an absolute start time or an offset with respect to a receipt of the control command.

41. The method of claim 40, wherein when the operation mode is the asynchronous operation mode, the control command includes information associated with a configuration of the second interface, and wherein the configuration of the second interface is triggered by a receipt of the control command.

42. A method for wireless communication at a repeater, comprising:
transmitting, to a network node via a first interface, information associated with one or more capabilities of the the repeater; and
receiving, from the network node and via the first interface, an indication of an operation mode for the repeater before communicating with the network node via a second interface in accordance with the operation mode, the second interface being different from the first interface, the operation mode being one of an asynchronous operation mode or a synchronous operation mode,
wherein the indication of the operation mode is included in a timing configuration field of a control command, the timing configuration field identifying a start time of synchronous operation when the operation mode is the synchronous operation mode, and wherein the start time is one of an absolute start time or an offset with respect to a receipt of the control command.

43. The method of claim 42, wherein when the operation mode is the asynchronous operation mode, the control command includes information associated with a configuration of the second interface, the configuration of the second interface being triggered by a receipt of the control command.

44. The method of claim 42, wherein the first interface is an interface that uses a sub-6 gigahertz (GHz) frequency and the second interface is a millimeter wave interface.

45. The method of claim 42, wherein the information associated with the one or more capabilities of the repeater includes information associated with timing, one or more synchronization capabilities of the repeater, or some combination thereof.

46. The method of claim 42, wherein the start time is the absolute start time.

47. The method of claim 42, wherein the start time is the offset with respect to the receipt time of the control command.

48. A repeater for wireless communication, comprising:
a memory; and
one or more processors coupled to the memory, the one or more processors configured to:
transmit, to a network node via a first interface, information associated with one or more capabilities of the repeater; and
receive, from the network node and via the first interface, an indication of an operation mode for the repeater before communication with the network node via a second interface in accordance with the operation mode, the second interface being different from the first interface, the operation mode being one of an asynchronous operation mode or a synchronous operation mode,
wherein the indication of the operation mode is included in a timing configuration field of a control command, the timing configuration field identifies a start time of synchronous operation when the operation mode is the synchronous operation mode, and wherein the start time is one of an absolute start time or an offset with respect to a receipt of the control command.

49. The repeater of claim 48, wherein when the operation mode is the asynchronous operation mode, the control command includes information associated with a configuration of the second interface, and wherein the configuration of the second interface is triggered by a receipt of the control command.

50. The repeater of claim 48, wherein the first interface is an interface that uses a sub-6 gigahertz (GHz) frequency and the second interface is a millimeter wave interface.

51. The repeater of claim 48, wherein the information associated with the one or more capabilities of the repeater includes information associated with timing, one or more synchronization capabilities of the repeater, or some combination thereof.

52. The repeater of claim 48, wherein the start time is the absolute start time.

53. The repeater of claim 48, wherein the start is the offset with respect to the receipt time of the control command.

54. The repeater of claim 48, wherein the communication with the network entity is based at least in part on a beamforming configuration.

55. A non-transitory computer-readable medium storing one or more instructions for wireless communication, the one or more instructions comprising:
one or more instructions that, when executed by one or more processors of a repeater, cause the repeater to:
transmit, to a network node via a first interface, information associated with one or more capabilities of the repeater; and
receive, from the network node and via the first interface, an indication of an operation mode for the repeater before communicating with the network node via a second interface in accordance with the operation mode, the second interface being different from the first interface, the operation mode being one of an asynchronous operation mode or a synchronous operation mode,
wherein the indication of the operation mode is included in a timing configuration field of a control command, the timing configuration field identifying a start time of synchronous operation when the operation mode is the synchronous operation mode, and wherein the start time is one of an absolute start time or an offset with respect to a receipt of the control command.

56. The non-transitory computer-readable medium of claim 55, wherein when the operation mode is the asynchronous operation mode, the control command includes information associated with a configuration of the second interface, and wherein the configuration of the second interface is triggered by a receipt of the control command.

57. The non-transitory computer-readable medium of claim 55, wherein the start time is the absolute start time.

58. The non-transitory computer-readable medium of claim 55, wherein the start is the offset with respect to the receipt time of the control command.

59. The method of claim 40, wherein the first interface is an interface that uses a sub-6 gigahertz (GHz) frequency and the second interface is a millimeter wave interface.

60. The method of claim 40, wherein the information associated with the one or more capabilities of the repeater includes information associated with timing, one or more synchronization capabilities of the repeater, or some combination thereof.

61. The method of claim 40, wherein the start time is the absolute start time.

62. The method of claim 40, wherein the start time is the offset with respect to a receipt time of the control command.

63. The method of claim 40, wherein the communicating with the repeater is based at least in part on a beamforming configuration.

64. An apparatus for wireless communication at a network node, comprising:
a memory;
one or more processors coupled to the memory, the one or more processors configured to:
receive, from a repeater having a first interface and a second interface, information associated with one or more capabilities of the repeater, the second interface being different from the first interface;
determine an operation mode for the repeater based at least in part on the information associated with the one or more capabilities of the repeater, the operation mode determined to be one of an asynchronous operation mode or a synchronous operation mode; and
indicate the operation mode to the repeater via the first interface before communication with the repeater via the second interface in accordance with the operation mode, the operation mode indicated to the repeater in a timing configuration field of a control command, wherein the timing configuration field identifies a start time of synchronous operation when the operation mode is the synchronous operation mode, and wherein the start time is one of an absolute start time or an offset with respect to a receipt of the control command.

65. The apparatus of claim 64, wherein when the operation mode is the asynchronous operation mode, the control command includes information associated with a configuration of the second interface, and wherein the configuration of the second interface is triggered by a receipt of the control command.

66. The apparatus of claim 64, wherein the first interface is an interface that uses a sub-6 gigahertz (GHz) frequency and the second interface is a millimeter wave interface.

67. The apparatus of claim 64, wherein the information associated with the one or more capabilities of the repeater includes information associated with timing, one or more synchronization capabilities of the repeater, or some combination thereof.

68. The apparatus of claim 64, wherein the start time is the absolute start time.

69. The apparatus of claim 64, wherein the start time is the offset with respect to a receipt time of the control command.

70. The apparatus of claim 64, wherein the communication with the repeater is based at least in part on a beamforming configuration.

71. A non-transitory computer-readable medium storing one or more instructions for wireless communication, the one or more instructions comprising:
one or more instructions that, when executed by one or more processors of a network node, cause the network node to:
receive, from a repeater having a first interface and a second interface, information associated with one or more capabilities of the repeater, the second interface being different from the first interface;
determine an operation mode for the repeater based at least in part on the information associated with the one or more capabilities of the repeater, the operation mode determined to be one of an asynchronous operation mode or a synchronous operation mode; and
indicate the operation mode to the repeater via the first interface before communication with the repeater via the second interface in accordance with the operation mode, the operation mode indicated to the repeater in a timing configuration field of a control command, wherein the timing configuration field identifies a start time of synchronous operation when the operation mode is the synchronous operation mode, and wherein the start time is one of an absolute start time or an offset with respect to a receipt of the control command.

72. The non-transitory computer-readable medium of claim 71, wherein when the operation mode is the asynchronous operation mode, the control command includes information associated with a configuration of the second interface, and wherein the configuration of the second interface is triggered by a receipt of the control command.

73. The non-transitory computer-readable medium of claim 71, wherein the start time is the absolute start time.

74. The non-transitory computer-readable medium of claim 71, wherein the start time is the offset with respect to a receipt time of the control command.

\* \* \* \* \*